United States Patent [19]
Brindel et al.

[11] Patent Number: 6,081,631
[45] Date of Patent: Jun. 27, 2000

[54] MODULATION METHOD AND SEMICONDUCTOR OPTICAL MODULATOR

[75] Inventors: Patrick Brindel, Longpont sur Orge; Sébastien Bigo, Palaiseau, both of France

[73] Assignee: Alcatel, Paris, France

[21] Appl. No.: 09/010,059

[22] Filed: Jan. 21, 1998

[30] Foreign Application Priority Data

Jan. 23, 1997 [FR] France ................................. 97 00682

[51] Int. Cl.[7] .................................................. G02F 1/25
[52] U.S. Cl. ...................................... 385/1; 385/2
[58] Field of Search ......................... 385/1–3; 257/431, 257/436

[56] References Cited

U.S. PATENT DOCUMENTS

| | | | |
|---|---|---|---|
| 5,048,907 | 9/1991 | Wickman et al. | 385/2 |
| 5,105,240 | 4/1992 | Omura | 257/85 |
| 5,126,553 | 6/1992 | England et al. | 257/431 |
| 5,229,622 | 7/1993 | Cavailles | 257/21 |
| 5,305,343 | 4/1994 | Allovon et al. | 372/50 |
| 5,311,221 | 5/1994 | Vodjdani et al. | 359/130 |
| 5,329,601 | 7/1994 | Nakamura | 385/2 |
| 5,402,259 | 3/1995 | Lembo et al. | 385/2 |
| 5,479,539 | 12/1995 | Goldsmith et al. | 385/14 |
| 5,559,323 | 9/1996 | Campi et al. | 250/214.1 |
| 5,559,628 | 9/1996 | Devaux | 359/248 |
| 5,654,812 | 8/1997 | Suzuki | 359/139 |
| 5,959,764 | 9/1999 | Edagawa et al. | 359/326 |

FOREIGN PATENT DOCUMENTS

| | | |
|---|---|---|
| 0726483A2 | 8/1996 | European Pat. Off. . |
| 2724778A1 | 3/1996 | France . |

*Primary Examiner*—John D. Lee
*Assistant Examiner*—Michael J. Stahl
*Attorney, Agent, or Firm*—Sughrue, Mion, Zinn, Macpeak & Seas, PLLC

[57] ABSTRACT

In an optical modulation method a wave to be modulated and an optical control wave are injected simultaneously and colinearly into the same waveguide formed in a semiconductor diode that is reverse-biased so that the waveguide and the diode constitute the semiconductor part of an electro-absorption modulator. The wavelength of the control wave is shorter than that of the wave to be modulated. The impedance at the terminals of the diode is sufficiently high to enable amplitude modulation of the control wave to be transferred to the wave to be modulated. Applications include fiber optic telecommunication systems, in particular for resynchronizing solitons.

10 Claims, 2 Drawing Sheets

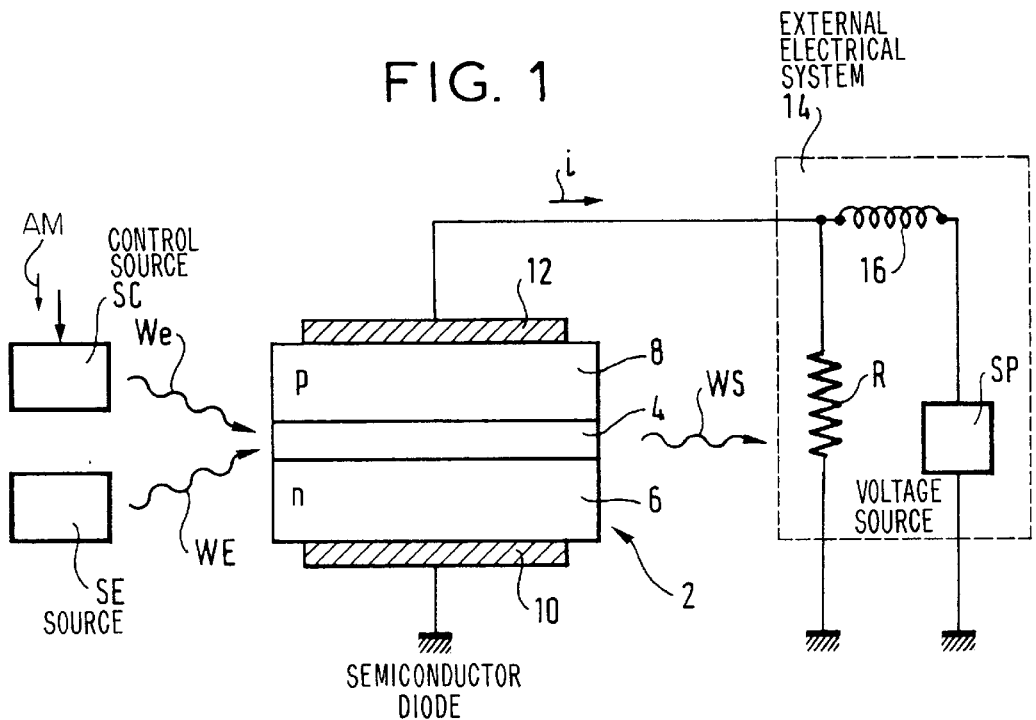
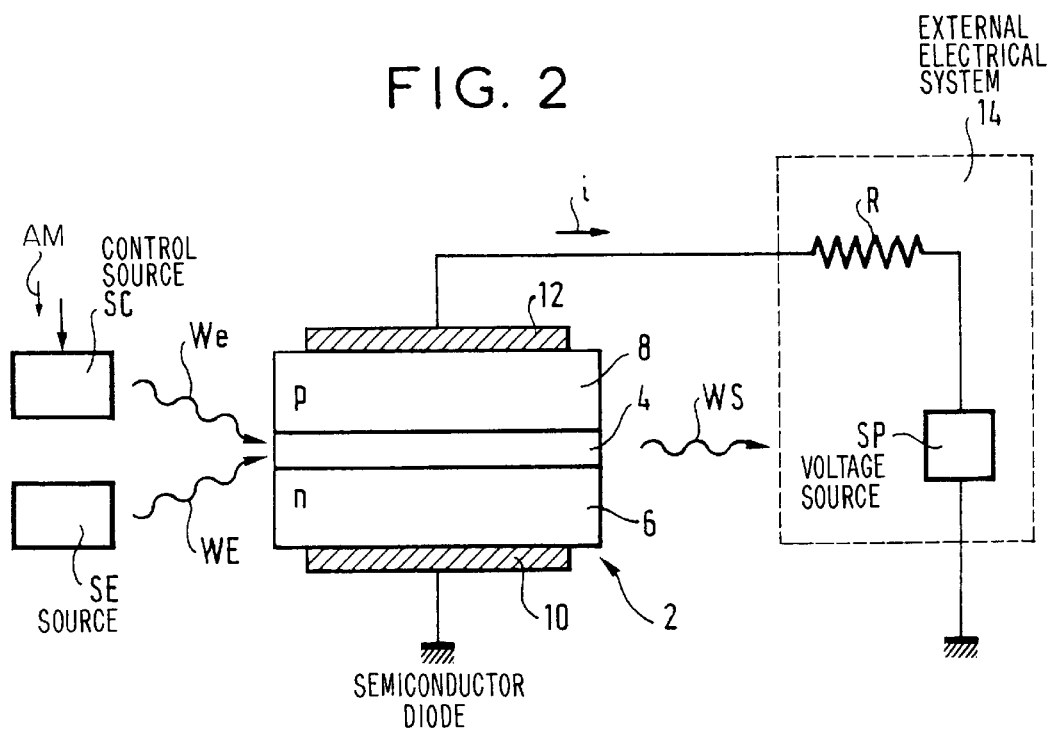

MODULATION METHOD AND SEMICONDUCTOR OPTICAL MODULATOR

BACKGROUND OF THE INVENTION

1. Field of the Invention

The present invention concerns a modulator able to modulate the amplitude of an optical wave or to modify pre-existing amplitude modulation of an optical wave.

2. Description of the Prior Art

In this context modulation means any variation of the amplitude of the wave with time. In the typical situation in which the purpose of the modulation is to enable transmission of information, the information elements can be represented directly by the instantaneous values of this amplitude. However, the modulation can also convert an optical wave into a succession of pulses, in which case the information elements are represented by the gaps between the pulses.

This invention finds applications in certain cases where a modulator has to process optical signals that are particularly brief or fast. This requires the modulator to be equally fast, in other words for it to have equally short response times. Its passband then extends up to the corresponding high frequencies. These situations arise in fiber optic transmission networks in which information to be transmitted is represented by extremely brief timed pulses constituting solitons.

Various types of fast optical modulator are known in the art.

A first type of modulator of this kind is the electro-absorption modulator which includes a reverse-biased semiconductor diode. This diode receives the optical wave to be modulated and an electrical control signal. Its bandwidth is unfortunately limited to around 10 GHz or 20 GHz, which is sometimes insufficient.

This type of modulator is described in an article by F. Devaux et al "Full polarization insensitivity of a 20 Gb/s strained-MQW Electroabsorption Modulator", IEEE Photonics Technology Letters Vol 6 No. Oct. 10, 1994, p. 1203–1206.

A second prior art fast modulator is the semiconductor amplifier including a forward-biased diode. This diode receives the wave to be modulated and an electrical control signal. Its bandwidth is unfortunately limited to around 20 GHz. This type of modulator is described in an article by J. C. Simon et al "Gain and Noise characteristics of a 1.5 $\mu$m near travelling wave semiconductor laser amplifier", Electronic Letters vol. 25 No. 7, 1989, p. 434–436.

A third type of prior art fast modulator is the non-linear optical loop mirror (NOLM). It is constructed from optical fibers and uses an optical control signal. This signal is formed optically from pre-existing modulation of the wave to be modulated. More particularly, clock pulses are formed from this wave by an optical clock recovery system and constitute the control signal of the modulator for resynchronizing pulses of the wave to be modulated. This type of modulator is described in an article by S. Bigo, O. Audouin and E. Desurvire "Analysis of soliton in-line regeneration through two-wavelength nonlinear loop mirror as synchronous amplitude/phase modulator", Elect.

Letters, Dec. 7th1995, Vol. 31, No. 25, p. 2191. It has the drawback of being complex, in particular if a pre-existing polarization state of the wave to be modulated must be maintained.

A fourth prior art fast modulator is a surface reflection saturable absorber, i.e. a stack of semiconductor layers including a Bragg mirror and quantum wells. One of the two outside surfaces is metallized to reflect light and the other is transparent. The wave to be modulated and a control wave having a different wavelength and constituting an optical control signal are injected simultaneously through the transparent surface. The wave to be modulated is partially reflected by the Bragg mirror and completely reflected by the metallized surface. Because of the resulting interference in particular, its output power is increased or decreased by increasing or decreasing the power of the control wave. This modulator is described in an article by H. Tsuda, A. Hirano, R. Takahashi, K. Sato and K. Hagimoto: "3 PS, 2.4 Gbit/s All-Optical Pulse Discrimination Experiment: All-optical Regenerator based on a High-speed Saturable Absorber Optical Gate", Proc. 21st Eur. Conf. on Opt. Comm. (ECOC'95-Brussels) pp 949–952. Industrial application of this type of modulation would appear to be inevitably difficult, especially if it has to be included in an optical device integrated on a semiconductor substrate.

The aims of the present invention include:

- widening the bandwidth of an optical modulator in a simple manner,
- in particular avoiding the use of electrical modulation signals for this purpose,
- providing a fast optical modulator preserving the polarization state of a wave to be modulated in a simple manner,
- facilitating the incorporation of a fast optical modulator into an integrated optical device, and
- providing a simple way to resynchronize solitons in a communication system using solitons guided by long optical fibers.

SUMMARY OF THE INVENTION

The present invention consists in an optical modulation method wherein a wave to be modulated and an optical control wave are injected simultaneously and colinearly into the same waveguide formed in a semiconductor diode that is reverse-biased so that the waveguide and the diode constitute the semiconductor part of an electro-absorption modulator, the wavelength of the control wave is shorter than that of the wave to be modulated and the impedance at the terminals of the diode is sufficiently high to enable amplitude modulation of the control wave to be transferred to the wave to be modulated.

Various embodiments of this invention are described by way of example with reference to the accompanying diagrammatic drawings.

BRIEF DESCRIPTION OF THE DRAWINGS

FIGS. 1 and 2 respectively show first and second modulators in accordance with this invention.

DETAILED DESCRIPTION OF THE PREFERRED EMBODIMENTS

Figure 3:
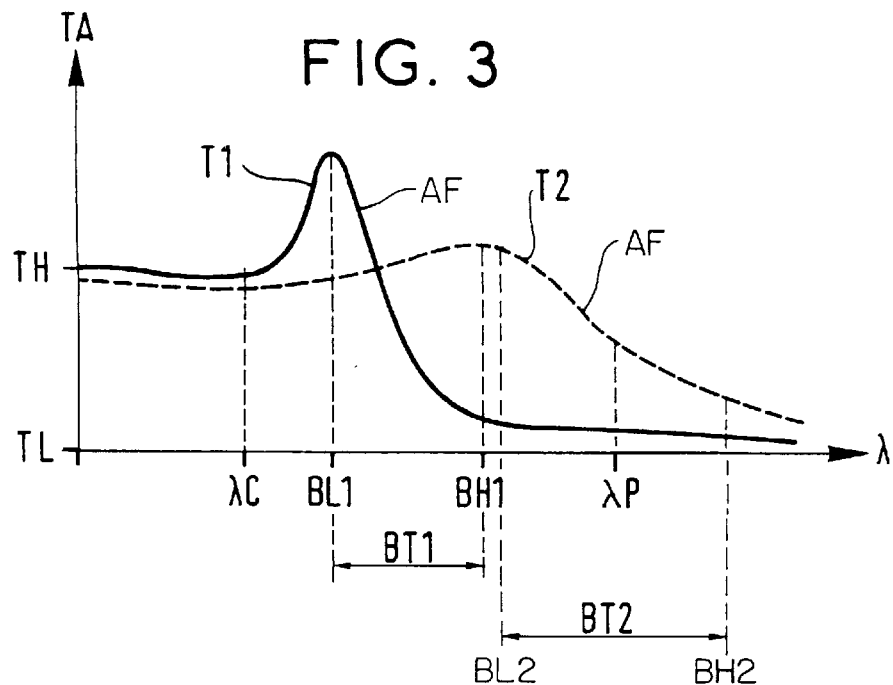
FIG. 3 shows two diagrams representing variations in the absorption rate of the absorbing element of a modulator as a function of the wavelength of an optical wave to be modulated, this wavelength being plotted on the abscissa axis, the two diagrams respectively corresponding to two values of the bias voltage of the modulator, which can be of the prior art electro-absorption type or in accordance with the present invention.

Referring to FIG. 1 or FIG. 2, a modulator in accordance with this invention includes a semiconductor diode 2. This diode includes an undoped layer 4, in other words a layer that is not intentionally doped, between an n doped layer 6 and a p doped layer 8. The refractive index of the layer 4 is higher than that of the layers 6 and 8 enabling optical waves WE and We to be guided by the layer 4. The latter constitutes an absorber of these guided waves. This absorber absorbs the power of these waves in a proportion defined by an absorption rate TA that varies as a function of the guided wavelength λ. As shown in FIG. 3 the diagram of this variation features an absorption front AF for two curves at a first time T1 and a second time T2. This occupies a transition band BT1 or BT2 which extends in the spectrum of wavelengths from a lower limit BL1 or BL2 to an upper limit BH1 or BH2, according to the value of an electrical potential difference between the layers 6 and 8. This absorption rate has a maximal value TH or a decreasing value or a minimal value TL according to whether the guided wavelength is less than the lower limit, increasing between the lower limit and the upper limit, or greater than the upper limit, respectively.

The modulator further includes the following components:

Means such as a source SE, for example, for injecting an optical wave into the absorber 4, this optical wave constituting an input wave WE that is to receive amplitude modulation AM to form an output wave WS. The wavelength of the input wave is referred to hereinafter as the carrier wavelength λ P. It is at least temporarily within said transition band.

Two electrical terminals 10 and 12 for the diode 2.

Finally, an electrical system 14 external to the diode 2 which connects the terminals 10 and 12 of the diode via a coupling impedance R internal to the system whilst applying a bias voltage between these terminals in the reverse bias direction of the diode. The components mentioned above, i.e. the diode with its terminals, the means for injecting the input wave and the electrical system, are typically those that constitute an electro-absorption modulator of a type that is known in itself except for how the bias voltage is controlled and the value of the coupling impedance.

In the case of the present invention the modulator further includes a control source SC for injecting a control wave We into the absorber 4 at the same time as the input wave WE. The control wave is an optical wave. It has a control wavelength λ C which is always less than the bottom limit BL1 of the transition band. It has a control power PC subject to variations representative of the amplitude modulation to be applied to the input wave. The coupling impedance R is made sufficiently high for the control power variations to effect the amplitude modulation by displacing said transition band, for example between two positions BT1 and BT2 shown in FIG. 3.

The displacement of the transition band is the result of a new combination of four phenomena known in themselves:

A first of these phenomena is related to a variation, for example an increase, in the control power, i.e. the power of the control wave We at the absorber input. At least some of the power of this wave is absorbed in this absorber and constitutes an absorbed power. The advantages of this invention become apparent when the control power is limited, i.e. when it is at least temporarily less than a saturation threshold beyond which an increase in this power would not cause any further increase in the absorbed power. Below this threshold increasing the control power therefore causes an increase in the absorbed power.

By virtue of a second phenomenon that is known in itself the absorbed power is used to generate electron-hole pairs in the absorber. The charge carriers created in this way are removed from the absorber by the bias voltage applied by the external electrical system 14 which produces an electric field between the n and p doped layers. The removal of these charge carriers constitutes a flow of electric current in this system. This electric current is referred to as the "photocurrent" hereinafter. Increasing the absorbed power increases the value i of this photocurrent.

In accordance with a third phenomenon known in itself, which is described by Ohm's law, the photocurrent flowing in the coupling impedance influences the bias voltage applied between the terminals of the diode by the electrical system having this impedance. To be more precise, increasing the photocurrent reduces this voltage and this reduction in the voltage is equal to the product of the increase in current multiplied by this impedance.

The combination of the first, second and third phenomena known in themselves referred to above is the basis of operation of commercially available photodiodes in which the variations in the bias voltage constitute a measurement signal representative of the input power of an absorbed wave.

The present invention also exploits a fourth phenomenon known in itself whereby the position of the absorption front in the spectrum of wavelengths depends on the bias voltage. To be more precise, reducing the bias voltage displaces this front towards the shorter wavelengths.

For example, if the transition band BT2 initially contains the carrier wavelength λ P, it then extends in BT1 only over wavelengths less than this carrier wavelength (see FIG. 3). As a result the input wave is initially partly absorbed and is thereafter practically no longer absorbed. This leads to an increase in the power of the output wave, assuming that the input wave is of constant power. With the same hypothesis, reducing the control power would reduce the power of the output wave.

The fourth phenomenon described above is known as the Franz-Keldysh effect or the confined Stark effect according to whether the absorber 4 is a solid material or of a succession of quantum wells and barriers. It is the basis of the operation of commercially available electro-absorption modulators that do not include any optical control source. The bias voltage variations are imposed by the external electrical system. They must faithfully reflect the variations in a modulating signal controlling this system, i.e. they must in particular be as independent as possible of the variations in the photocurrent. This is why, in a prior art modulator of this kind, the coupling impedance presented by the external electrical system to the terminals of the diode must be low. To the contrary, in a modulator in accordance with the present invention this impedance must be relatively high to enable the variations in the photocurrent to cause sufficiently large variations in the bias voltage.

This impedance can be obtained in various ways. Its value can therefore depend on the frequency concerned. In this case the relatively high impedance value mentioned above must be obtained within the passband of the modulator, i.e. within the frequency band within which variations in the control power must be transmitted in the form of variations in the power of the output wave.

As to the choice of this value, it may be stated that a relation seems to have to be generally verified at least in the passband of the modulator between the absolute value |z| of the coupling impedance (R) in ohms and the amplitude ΔPC of the variations in control power in watts. This relation is written $$|z|=\alpha/\Delta PC$$

α being a coefficient between 0.05 and 20. More particularly, this coefficient seems to have to be between 0.1 and 10 and even more particularly between 0.5 and 5.

The coupling impedance is typically a resistance R the value of which is also designated hereinafter by the letter R. The control power typically varies between zero and a maximal value PC such that the amplitude of the variations in this power is equal to this maximal value. The above relation is then written $R=\alpha/PC$.

The power PC typically has a maximal value between 1 mW and 10 mW, more particularly around 5 mW. As a result the absolute value |z | of the coupling impedance in the passband of the modulator is typically between 20 Ω and 500 Ω and more particularly at least equal to 50 Ω.

As to the bias voltage, it is typically less than 5 V and advantageously between 0.5 V and 4 V.

Generally speaking, it must be understood that the diode 2 is advantageously the semiconductor chip of a prior art electro-absorption modulator and that the skilled person can determine suitable values of the various electrical parameters for each particular application. To this end the skilled person can take into account the well known properties of such electro-absorption modulators and the yield K of conversion of the absorbed optical power into photocurrent. This yield K typically has values between 0.5 $A.W^{-1}$ and 1.5 $A.W^{-1}$.

The electrical system 14 preferably includes:
  a voltage supply SP supplying the bias voltage and having an internal impedance that is low compared to the coupling impedance, and
  a coupling resistance R constituting this coupling impedance or the major part of it.

In the first modulator, shown in FIG. 1, the voltage source SP is connected to the terminals 10 and 12 of the diode 2 via an isolating inductor 16 and the coupling resistance R is connected in parallel with this voltage source. The inductance can of course be replaced with other isolating components able to pass the direct current but isolating the source SP from the diode at frequencies in the passband of the modulator.

In the second modulator, shown in FIG. 2, the voltage source SP and the coupling resistance R are connected in series between the terminals 10 and 12 of the diode 2.

Figure 4:
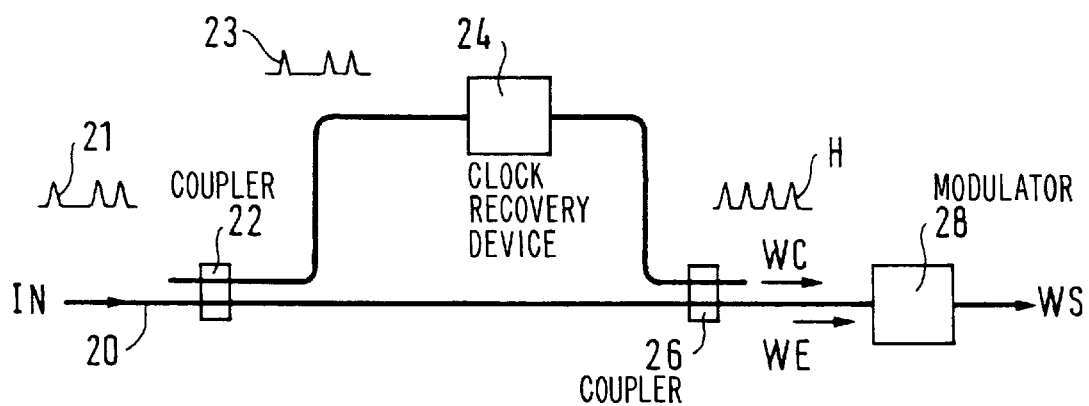
FIG. 4 shows an entirely optical synchronous regenerator device applicable to solitons and using a modulator of the present invention.

Referring to FIG. 4, a synchronous regenerator device includes an optical fiber 20 receiving a stream 21 of solitons carrying information. This stream is clocked at a frequency F, but the solitons have been amplified several times as they propagate along the line to compensate line losses and are subject to jitter. Some of the energy of the solitons is diverted using an input coupler 22 to form a branch stream 23. This is received by a clock recovery device 24 which is preferably of an entirely optical type. The device 24 supplies in response a regular succession of clock pulses H the repetition frequency of which is the frequency F. These pulses are injected into the fiber 20 with the aid of a mixing coupler 26. On leaving the fiber the solitons and the clock pulses are received by a modulator 28 in accordance with the present invention and for which they respectively constitute the input wave WE and the control wave We previously mentioned. The output wave WS then includes a regenerated stream of solitons carrying the same information as the stream 21. A device of this kind is described in an article by H. Kubota and M. Nagazawa "Soliton Transmission control in time and frequency domain", IEEE J. Quantum Electron vol. 29, No. 7 p. 2189 (1993).

Figure 5:
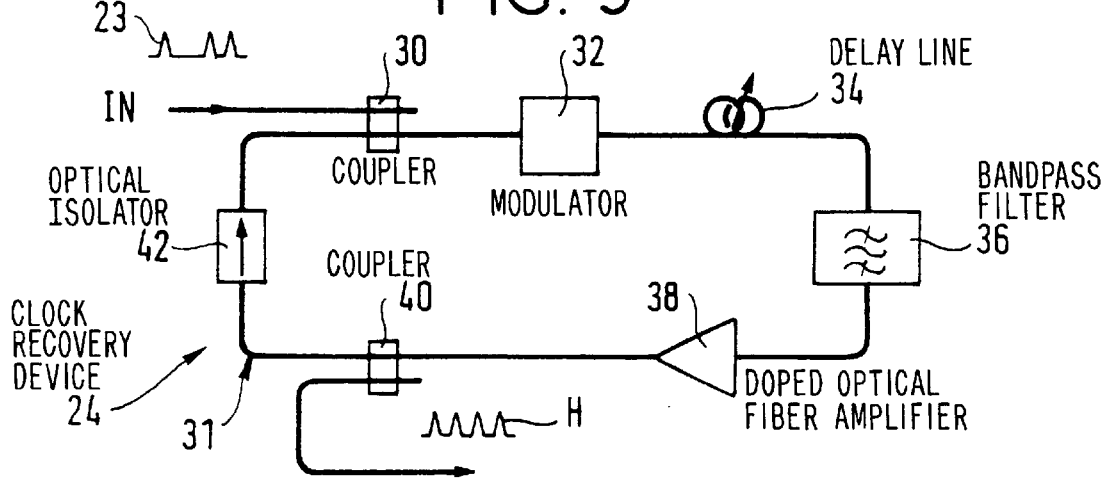
FIG. 5 shows an entirely optical clock recovery device that can be used in the regenerator device from FIG. 4 and employing a modulator in accordance with the present invention.

Referring to FIG. 5, a clock recovery device 24 receives a stream of solitons such as the branch stream 23 via a coupler 30 which injects this stream into an optical fiber loop 31 constituting a mode-locked laser. This loop then includes, in looped series:
  a modulator 32 in accordance with the present invention, the stream 23 constituting for this modulator the control wave previously mentioned,
  a delay line 34 the time-delay of which is adjusted to obtain resonance at the previous mentioned repetition frequency F,
  a bandpass filter 36 centered on the control wavelength λ C previously mentioned,
  a doped optical fiber amplifier 38,
  an output coupler 40 which diverts some of the light circulating in the loop 31 to constitute the clock pulses H, and
  an optical isolator 42 defining the direction of propagation of light in the loop 31.

A device of the above kind is described in an article by K. Smith and J. K. Lucek "All optical-clock recovery using a mode-locked laser", Electron. Lett. Vol. 28 no. 19 p. 1814 (1992).

What is claimed is:

1. An optical modulation method wherein a wave to be modulated and an optical control wave are injected simultaneously and colinearly into the same waveguide formed in a semiconductor diode that is reverse-biased so that said waveguide and said diode constitute the semiconductor part of an electro-absorption modulator, the wavelength of said control wave is shorter than that of said wave to be modulated and the impedance at the terminals of said diode is sufficiently high to provide a transfer of amplitude modulation of said control wave to said wave to be modulated by bias voltage modulation.

2. A semiconductor optical modulator including:
  a semiconductor diode having an undoped layer between an n doped layer and a p doped layer enabling optical waves to be guided by said undoped layer, said undoped layer constituting an absorber for said guided waves, said absorber having an absorption rate that varies as a function of the guided wavelength, said variation having an absorption front occupying a transition band extending from a lower limit to an upper limit in the spectrum of wavelengths, said absorption rate having a maximal value or a decreasing value or a minimal value according to whether said guided wavelength is less than said lower limit or increasing between said lower limit and said upper limit or greater than said upper limit, respectively, the position of said transition band in said spectrum of wavelengths being responsive to an electric field in said absorber,
  means for injecting an optical wave into said absorber, said optical wave constituting an input wave to receive amplitude modulation to form an output wave, a wavelength of said input wave constituting a carrier wavelength and being at least temporarily in said transition band,
  two electrical terminals for said diode, and
  an electrical system external to said diode mutually connecting said terminals of said diode via a coupling impedance internal to said system whilst applying a bias voltage between said terminals in a reverse bias direction of said diode, said modulator further including a control source for injecting a control wave into said absorber simultaneously and colinearly with said input wave, said control wave being an optical wave having a control wavelength remaining less than said lower limit of said transition band and having a limited control power subject to variations representative of said amplitude modulation to be applied to said input wave, said coupling impedance being sufficiently high for said variations of said control power to effect said amplitude modulation by displacing said transition band.

3. The modulator claimed in claim 2 wherein the following relation is verified at least in a passband of said modulator between an absolute value |z| of said coupling impedance in ohms and the amplitude ΔPC of said variations in control power in watts:

$$|z|=\alpha/\Delta PC$$

where α is a coefficient between 0.05 and 20.

4. The modulator claimed in claim 3 wherein said coefficient α is between 0.1 and 10.

5. The modulator claimed in claim 2 wherein said control power has a maximal value between 1 mW and 10 mW.

6. The modulator claimed in claim 2 wherein an absolute value |z| of said coupling impedance in the passband of said modulator is between 20 Ω and 500 Ω.

7. The modulator claimed in claim 2 wherein said bias voltage is less than 5 V.

8. The modulator claimed in claim 2 wherein said electrical system includes:

a voltage source supplying said bias voltage and having an internal impedance that is low in comparison to said coupling impedance, and a coupling resistance substantially constituting said coupling impedance.

9. The modulator claimed in claim 8 wherein said voltage source is connected to said terminals of said diode via an isolating component and said coupling resistance is connected in parallel with said voltage supply.

10. The modulator claimed in claim 8 wherein said voltage source and said coupling resistance are connected in series between said terminals of said diode.

* * * * *